United States Patent
Doak et al.

(10) Patent No.: US 10,413,920 B2
(45) Date of Patent: Sep. 17, 2019

(54) NOZZLE APPARATUS AND TWO-PHOTON LASER LITHOGRAPHY FOR FABRICATION OF XFEL SAMPLE INJECTORS

(71) Applicants: R. Bruce Doak, Heidelberg (DE); Garrett Nelson, Tempe, AZ (US)

(72) Inventors: R. Bruce Doak, Heidelberg (DE); Garrett Nelson, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/572,028

(22) PCT Filed: Jun. 17, 2016

(86) PCT No.: PCT/US2016/038212
§ 371 (c)(1),
(2) Date: Nov. 6, 2017

(87) PCT Pub. No.: WO2017/003725
PCT Pub. Date: Jan. 5, 2017

(65) Prior Publication Data
US 2018/0154380 A1    Jun. 7, 2018

Related U.S. Application Data

(60) Provisional application No. 62/186,318, filed on Jun. 29, 2015.

(51) Int. Cl.
*B05B 7/04*    (2006.01)
*B05B 1/04*    (2006.01)
(Continued)

(52) U.S. Cl.
CPC .............. *B05B 7/0441* (2013.01); *B05B 1/04* (2013.01); *B05B 7/0475* (2013.01); *B33Y 10/00* (2014.12); *B33Y 30/00* (2014.12); *B33Y 80/00* (2014.12)

(58) Field of Classification Search
CPC ... B05B 7/0441; B05B 7/0458; B05B 7/0475; B05B 1/04; B33Y 10/00; B33Y 80/00; B33Y 30/00
(Continued)

(56) References Cited

U.S. PATENT DOCUMENTS 3,014,666 A * 12/1961 Verbouwens ......... B05B 7/0458
239/311
3,531,050 A *  9/1970 Abraham .............. B05B 7/0441
239/427.3

(Continued)

FOREIGN PATENT DOCUMENTS

JP    10-197145 A    7/1998
WO    2014/047358 A1    3/2014

OTHER PUBLICATIONS

The International Search Report (ISR) for PCT/US2046/038212 dated Sep. 30, 2016, pp. 1-4.
(Continued)

*Primary Examiner* — Chee-Chong Lee
*Assistant Examiner* — Joseph A Greenlund
(74) *Attorney, Agent, or Firm* — Michael Best & Friedrich LLP (57) ABSTRACT

Nozzle apparatus for producing a liquid jet are disclosed. An example nozzle apparatus includes: (a) an outer nozzle housing defining a cavity and having an outlet defined at an apex of the cavity, (b) a cylindrical sidewall coupled to a base of the nozzle housing, where the cylindrical sidewall defines a plurality of arch-shaped voids and (c) an inner
(Continued)

housing coupled to the outer nozzle housing, where the inner housing has a first end and a second end, where at least the first end of the inner housing is arranged within the cavity of the outer nozzle housing, where the inner housing defines a through-hole that is arranged concentric with the outlet of the outer nozzle housing.

20 Claims, 8 Drawing Sheets

(51) Int. Cl.
  *B33Y 10/00* (2015.01)
  *B33Y 80/00* (2015.01)
  *B33Y 30/00* (2015.01)
(58) Field of Classification Search
  USPC .... 239/589, 590, 590.3, 502, 504, 518, 522, 239/399, 432
  See application file for complete search history.

(56) References Cited

U.S. PATENT DOCUMENTS

| | | | | |
|---|---|---|---|---|
| 3,764,069 | A * | 10/1973 | Runstadler, Jr. et al. | B05B 7/0458 239/8 |
| 4,934,329 | A * | 6/1990 | Lear | F02M 51/0682 123/531 |
| 6,050,504 | A * | 4/2000 | Schultz | B05B 7/0475 239/327 |
| 6,773,659 | B2 * | 8/2004 | Dunne | C21O 5/4613 266/225 |
| 7,464,553 | B2 * | 12/2008 | Hsieh | F23R 3/14 60/740 |
| 7,617,993 | B2 * | 11/2009 | Srinivasan | B05B 17/0607 239/102.1 |
| 7,967,221 | B2 * | 6/2011 | Snyder | B05B 7/0416 239/418 |
| 8,985,478 | B2 * | 3/2015 | Wurz | B05B 7/0458 239/112 |
| 9,050,481 | B2 * | 6/2015 | Fenton | A61L 2/22 |
| 9,581,376 | B2 * | 2/2017 | Kayano | F04F 5/10 |
| 10,052,647 | B2 * | 8/2018 | Diebel | B05B 15/55 |
| 2004/0140374 | A1 | 7/2004 | Snyder et al. | |
| 2007/0246575 | A1 * | 10/2007 | Cairo | B05B 7/0433 239/589 |
| 2009/0159725 | A1 * | 6/2009 | Prociw | B05B 7/0441 239/399 |
| 2010/0243753 | A1 | 9/2010 | Doak et al. | |
| 2011/0061423 | A1 * | 3/2011 | Ogata | F04F 5/10 62/500 |
| 2011/0247342 | A1 * | 10/2011 | Stewart | F23R 3/14 60/772 |
| 2013/0167566 | A1 * | 7/2013 | Alahyari | F25B 41/00 62/115 |
| 2013/0323089 | A1 * | 12/2013 | Han | F04F 5/463 417/176 |
| 2014/0076986 | A1 * | 3/2014 | Buchanan | G01N 15/1404 239/11 |
| 2014/0263693 | A1 * | 9/2014 | Doak | B05B 7/064 239/1 |
| 2014/0291423 | A1 * | 10/2014 | Gopalan | B05B 1/08 239/589.1 |
| 2015/0083818 | A1 * | 3/2015 | Al-Ansary | B05B 1/34 239/1 |
| 2015/0285502 | A1 * | 10/2015 | DiCintio | F23R 3/283 60/737 |
| 2016/0129634 | A1 * | 5/2016 | Keicher | B05B 7/06 425/70 |
| 2016/0195266 | A1 * | 7/2016 | Kim | F23R 3/14 239/406 |
| 2017/0028364 | A1 * | 2/2017 | Matsunaga | B01F 5/043 |
| 2017/0128964 | A1 * | 5/2017 | Morizane | B05B 7/025 |
| 2018/0022027 | A1 * | 1/2018 | Powell | B29C 64/209 239/139 |

OTHER PUBLICATIONS

The Written Opinion of the International Searching Authority for PCT/US2046/038212 dated Sep. 30, 2016, pp. 1-7.

* cited by examiner

NOZZLE APPARATUS AND TWO-PHOTON LASER LITHOGRAPHY FOR FABRICATION OF XFEL SAMPLE INJECTORS

CROSS-REFERENCE TO RELATED APPLICATIONS

This application is a U.S. national phase of International Application No. PCT/US2016/038212, filed on Jun. 17, 2016, which claims priority to U.S. Provisional Application No. 62/186,318, filed Jun. 29, 2015, both of which are incorporated by reference herein in their entirety.

BACKGROUND

Continuously transporting millions of environmentally sensitive protein crystals through high vacuum and into the pathway of the X-ray beam can be accomplished with the Gas Dynamic Virtual Nozzle (GDVN), which is capable of delivering a continuous, steady supply of hydrated sample in UHV for days without clogging.

2-Photon Polymerization (2PP) is a direct-write non-linear absorption process that is capable of patterning structures with resolution well beyond the diffraction limit. By tightly focusing a laser in a medium that is sensitive to only higher order effects, just a small region near the beam focus is polymerized. Features as small as 100 nm to 150 nm are made reproducibly. By moving the absorbing medium relative to the laser in a controlled manner, as in with a computer-generated design, complex high resolution structures are realized. In principle this allows all GDVN components to be formed using a single process at high resolution, an ideal situation.

However, challenges in making 2PP a viable printing technology for the GDVN arise due to the extreme differences in scale. The relatively large size of a traditional GDVN makes submicron resolution scanning a prohibitively long process in the absence of specialty fast-writing stages.

The Photonic Professional GT from Nanoscribe GmbH is capable of creating 400×400×400 cubic micron fast-written units at 150- to 500-nm resolution. These units may be stitched together to form larger volumes. The inclusion of many of these fast-written units in a given project may significantly increases the production time, since units are not written in their entirety one after the other, but rather all units are written at the same time layer by layer. For example, if a project consists of two 400×400×400 cubic micron blocks, the first layer of both blocks may be written and then followed by a second layer of both blocks, and so on. If there are n total layers, the mechanical motors that switch from one block to the next must switch n times. The movement of the motors is much slower than that of the fast writing mechanisms used in forming a single block (e.g., a piezo stage and galvo mirrors).

SUMMARY

Exemplary embodiments of nozzle apparatus are described that may advantageously utilize as few fast-written blocks as possible. The features of the nozzle apparatus may also beneficially minimize interaction of liquids and gases with the lower-resolution, and potentially permeable, interfaces between fast-written units. To accomplish this, the features of the nozzle that are most sensitive to asymmetry may be contained within a single 400×400×400 cubic micron unit (see, e.g., features contained in the boxed region of FIG. 1). These features include an outlet of the outer nozzle housing, the interior wall of the outer nozzle housing near the apex and the first end of the inner nozzle housing.

Thus, in one aspect, a nozzle apparatus is provided having (a) an outer nozzle housing defining a cavity and having an outlet defined at an apex of the cavity, (b) a cylindrical sidewall coupled to a base of the nozzle housing, where the cylindrical sidewall defines a plurality of arch-shaped voids and (c) an inner housing coupled to the outer nozzle housing, where the inner housing has a first end and a second end, wherein at least the first end of the inner housing is arranged within the cavity of the outer nozzle housing, where the inner housing defines a through-hole that is arranged concentric with the outlet of the outer nozzle housing.

These as well as other aspects, advantages, and alternatives, will become apparent to those of ordinary skill in the art by reading the following detailed description, with reference where appropriate to the accompanying drawings.

DETAILED DESCRIPTION

Example embodiments of a nozzle apparatus are described herein. Any example embodiment or feature described herein is not necessarily to be construed as preferred or advantageous over other embodiments or features. The example embodiments described herein are not meant to be limiting. It will be readily understood that certain aspects of the disclosed apparatus can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

The present embodiments advantageously provide a nozzle apparatus. Referring now to FIGS. 1-4, a nozzle apparatus 100 is shown that has an outer nozzle housing 105 defining a cavity 110 and having an outlet 115 defined at an apex 120 of the cavity 110. In one embodiment, an exterior surface 120 of the outer nozzle housing 105 may be beveled or conically-shaped. The angle of the exterior surface 120 of the outer nozzle housing 105 may have no apparent bearing on the function of jetting when the nozzle apparatus 100 is in use. However, the angle of the exterior surface 120 may have implications for nozzle applications where insufficient tapering of the nozzle exterior surface 120 may interfere with experimental objectives. For example, when used as a sample injector for serial crystallography, the angle may be less or equal to 30 degrees as measured from the central axis of the nozzle apparatus 100 in order to minimize shadowing of the detector by the nozzle apparatus 100. In one embodiment, the profile of the interior surface of the nozzle housing 105 may be arranged to gently taper or angle towards outlet 115 of the outer nozzle housing 105.

The nozzle apparatus 100 further includes a cylindrical sidewall 125 coupled to a base 130 of the outer nozzle housing 105. The cylindrical sidewall 125 defines a plurality of arch-shaped voids 126. In one embodiment, the outer nozzle housing 105 may be arranged to have an overhanging edge 135 that extends beyond the cylindrical sidewall 125 at the base 130 of the outer nozzle housing 105. This overhanging edge 135 may act as a back-stop when the nozzle apparatus 100 (including the already-glued-in central capillary 140, described below) is inserted into and glued into a sleeve 145 that acts as a passageway for gas to flow coaxially around the center capillary 140.

The nozzle apparatus 100 also includes an inner housing 150 coupled to the outer nozzle housing 105. The inner housing 150 has a first end 151 and a second end 152, and at least the first end 151 of the inner housing 150 is arranged within the cavity 110 of the outer nozzle housing 105. In one embodiment, an external wall of the first end 151 of the inner housing 150 may be tapered. In a further embodiment, an external wall of the second end 152 of the inner housing 150 may curve outward. The curvature of the outer wall of the inner housing 150 in the vicinity of the second end 152 of the inner housing 150 may be arranged to maximize the efficient removal of uncured photoresist and the reduction of drag from focusing gas, as well as maintain sufficient wall thickness for structural integrity.

Figure 1:
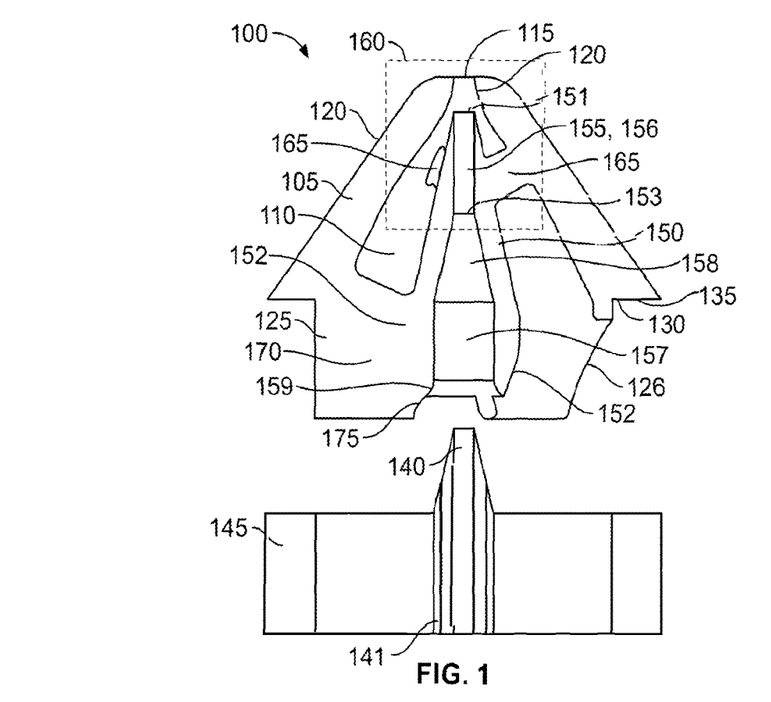
FIG. 1 is a side cross-sectional view of the center of the apparatus.
Figure 2:
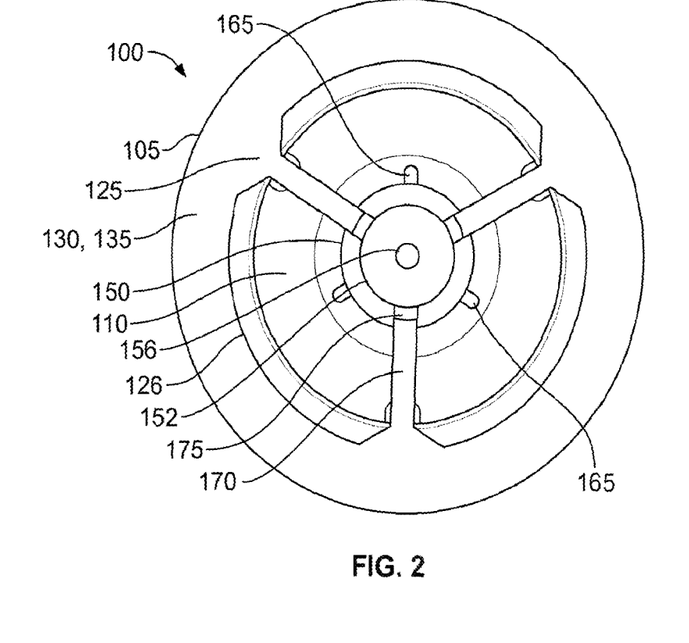
FIG. 2 is a bottom view of the apparatus.
Figure 3:
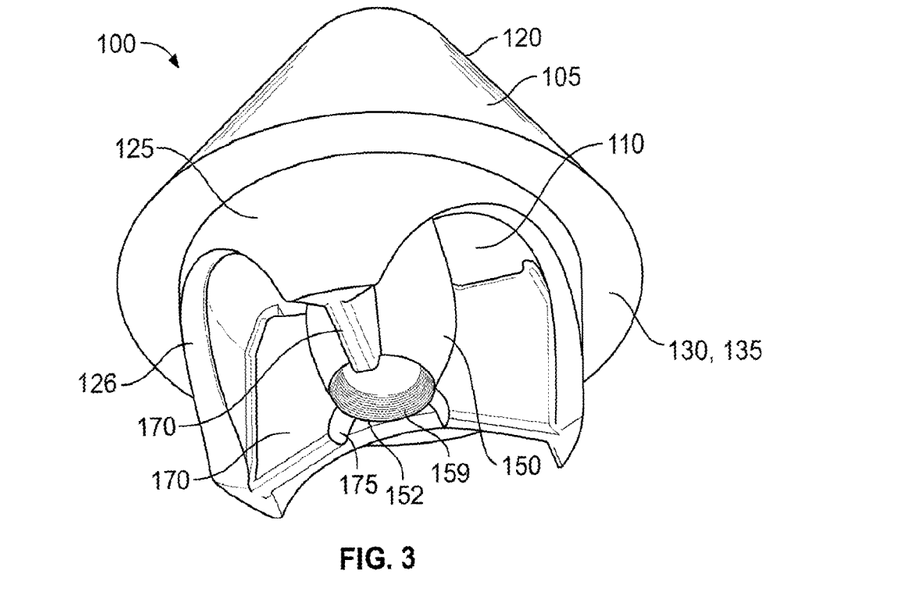
FIG. 3 is a bottom perspective view of the apparatus.
Figure 4:
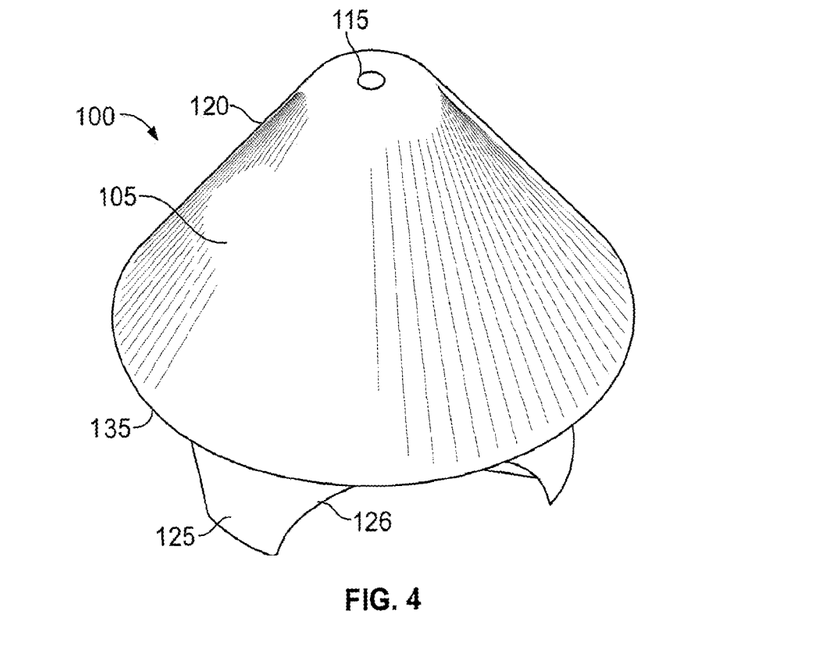
FIG. 4 is a top perspective view of the apparatus.

The inner housing defines a through-hole 155 that is arranged concentric with the outlet 115 of the outer nozzle housing 105. In one embodiment, the through-hole 155 of the inner housing 150 may have a first cylindrical portion 156 at the first end 151, a second cylindrical portion 157 at the second end 152 and a midsection 158 therebetween that tapers outward from the first cylindrical portion 156 to the second cylindrical portion 157. In another embodiment, the second end 152 of the inner housing 150 defines a fillet or a chamfer 159 around an edge of the second cylindrical portion 157 of the through-hole 155.

In one embodiment, the nozzle apparatus 100 may also include a capillary 140 coupled to the second end 152 of the inner housing 150. In a further embodiment, a tip of the capillary 140 may be disposed in the second cylindrical portion 157 of the inner housing 150, and the tip of the capillary 140 may be essentially flat. In an alternative embodiment, a tip of the capillary 140 may be disposed in the tapered midsection 158 of the inner housing 150, and the tip of the capillary 140 may be angled. In various embodiments, a tip of the capillary 140 may be located 400 μm or less from the outlet 115 of the outer nozzle housing 105.

In another embodiment, the cone-shaped midsection 158 of the inner housing 150 may be used as a seal to avoid excess glue or other adhesive flowing into the central sample supply line or through-hole 155, as well as the bore of the inserted capillary 140. In one example, this may be accomplished when using capillaries 140 having polymer coating 141 that have either a flat or an angled capillary tip (i.e., an angle larger than the angle of the midsection 158 of the inner housing 150). The mismatch of the profiles in either of these cases may have the effect of deforming the plastic coating 141 of the capillary 140 against the inner housing material to create a protective barrier to prevent over-gluing and to provide additional sealing properties after gluing is completed. In such a case, in one embodiment, the cone-shaped midsection 158 of inner housing 150 may be arranged such that the termination location 153 of a conical tip of the capillary 140 upon insertion in inner nozzle housing 150 may be situated no 400 microns or less from the exit end of outlet 115 in the outer nozzle housing 105. This arrangement may result in the liquid being transferred from the termination location 153 of the inserted capillary 140 directly into an uninterrupted, high resolution region within the boxed region 160 of FIG. 1 and along the through-hole 155 defined by the first end 151 of the inner housing 150. In another example, the angle of the capillary 140 may be made smaller than the angle of the midsection 158 of the inner housing 150. In this case the force applied to the inserted capillary 140 may be focused on the small annular contact region at termination location 153, resulting on a tight barrier that may more effectively prevent adhesive from passing though. At the same time, the extra space upstream of the contact annulus resulting from the angle mismatch may allow adhesive to travel close enough to the termination location 153 of the inserted capillary 140 to be within the volume defined within region 160 of FIG. 1, thus preventing gas or liquid permeation from the end of a to-be-inserted capillary 140 through the stitched interfaces at the edges of the 400×400× 400 cubic micron fast-written volumes. The cone-shaped receiving midsection 158 of inner housing 150 may also minimize the total amount of fast-written units required and assist in maintaining structural integrity.

While the material defining the cone profile of the midsection 158 of the inner housing 150 could be adjusted to allow a flat profile to reach within the 400-micron limit, such an arrangement may reduce the size of the gas focusing cavity 110 defined by the outer nozzle housing 105. In one embodiment, the volume of cavity 110 may be made to be as large as possible to promote the efficient removal of uncured photoresist during a chemical developing step of fabrication. However, accommodating such a flat profile arrangement by adjusting the outer nozzle housing 105 may compromise overall writing time and/or structural integrity of the nozzle apparatus.

In one embodiment, a first plurality of ribs 165 may be coupled to the first end 151 of the inner housing 150 and the outer nozzle housing 105. In a further embodiment, a second plurality of ribs 170 may be coupled to the second end 152 of the inner housing 150 and the cylindrical sidewall 125 of the outer nozzle housing 105, as shown in the cross-section of FIG. 1. In one embodiment, each of the second plurality of ribs 170 are each coupled to a portion of the cylindrical wall 125 extending between the arch-shaped voids 126. In one embodiment, the second plurality of ribs 170 may be positioned at and coupled to the base of the outer nozzle housing 105 at 120 degree intervals about the central axis of the outer nozzle housing 105. This first plurality of ribs 165 may be arranged 60 degrees out of phase with a second plurality of ribs R located at the second end of inner housing 150. One benefit of utilizing the first and second plurality of ribs 165, 170 may be to maximize the open volume of the cavity 110 between the inner housing 150 and nozzle outer housing 105 in order to allow efficient removal of uncured photoresist with the chemical developer. The connection points of the ribs 165, 170 may be fortified via fillets to further provide structural integrity during nozzle writing, mounting of the supply lines, and jet operation (e.g., at both high and low pressure extremes).

In a preferred embodiment, the secure attachment of the outer nozzle housing 105 to the inner housing 150 may be maintained during the entire writing process. Otherwise, "free-floating" structures that may be created before the 3D printing is completed may immediately begin to float upwards and may lead to a flawed result. For example, this is demonstrated by the continuous profile of surface 175 that transitions into convex fillet 159, thereby minimizing the possibility of free floating rings, etc.

In addition, with respect to manufacturing of the nozzle apparatus 100, previous trials with designs possessing a much smaller volume of the cavity 110 of the outer nozzle housing 105 resulted in prolonged chemical development steps that had the effect of distorting structures within the outer nozzle housing 105. In various other embodiments, additional features may be provided by the nozzle apparatus 100 that may provide increased interfacial surface area between the to-be-removed photoresist and the chemical developer to enable the efficient removal of uncured photoresist. For example, in one embodiment, the height of the arch-shaped voids 126 may be arranged to be spaced apart from the overhanging section 135 of the base 130 of the outer nozzle housing 105, in order to preserve a circumferentially continuous surface area for the purpose of coupling the nozzle apparatus 100 to an outer sleeve 145 of a capillary holder or sleeve 145 via adhesive, as one example. In one embodiment, the nozzle apparatus 100 may have three arch-shaped voids 126. In a further embodiment, a beveled-surface may be defined between each of the plurality of arch-shaped voids 126 and an interior surface of the cylindrical sidewall 125 that may thereby minimize drag from gas flow. In addition, in one embodiment, the nozzle apparatus 100 may be fabricated with the base of the outer nozzle housing 105 attached to a substrate. As such, the fillet 159 of the inner housing 150 may be elevated to permit any uncured photoresist within the through-hole 155 in the midsection 158 and in the second cylindrical portion 157 of the inner housing 150 to be removed efficiently. Alternatively, the contents of the through-hole 155 in the midsection 158 and in the second cylindrical portion 157 of the inner housing 150 could be removed through the first cylindrical portion 156 of the inner housing 150, but doing so may result in prolonged development time and may in turn lead to deformation of the cavity 110 of the nozzle apparatus 100.

In the embodiment that includes the fillet 159 in the second cylindrical portion 157 of the inner housing 150. The fillet 159 may define a concave surface that may act as a guide-surface area arranged about the inlet to the through-hole 155 in the second cylindrical portion 157 of the inner housing 150 to guide adhesive. For example, after the supply capillary 140 is inserted, fillet 159 provides a recess that may provide a pathway for an applied droplet of adhesive to be drawn completely around by capillary action, thereby minimizing the need for multiple applications of adhesive and/or complicated movements by the applicator, nozzle, or capillary structures. In practice, the adhesive may advance around the inserted capillary 140 at a faster rate than the rate at which it is drawn coaxially up the smaller cavity of the through-hole 155 between the inserted capillary's outer wall and the inner housing 150. In addition, advancing the adhesive at a faster rate may result in a more even distribution of the adhesive as it seeps up into any void between the capillary 140 and the inner housing 150. Once the circumference of the recess is filled, the adhesive may then propagate upwards in an approximately uniform way. This may be beneficial because excessive or poorly placed adhesive may adversely affect nozzle performance or may even render the nozzle apparatus 100 inoperable.

Experiments have shown that the size and curvature of the adhesive guide may have a bearing on the ease of adhesive application. However, the projection of the guide-surface area of the fillet profile arranged normal to the approach vector of the adhesive applicator, where the approach vector leads the tip of the applicator directly toward the termination location 153 of the inner housing 150 and the inserted capillary 140, (the base of the second cylindrical portion 157 of the inner housing 150) may be in a preferred embodiment, in its smallest end-to-end dimension, either equal to or less than the diameter of any adhesive sphere that forms on tip of the applicator. This is because efficient spreading of the applied adhesive may be hindered if the initial contact point from an applicator (i.e., a small glue sphere on the end of a needle tip) is not within the adhesive guide-surface area (i.e., the fillet 159). Approaching the convex surface of fillet 159 (i.e. the surface directed towards or facing the glue sphere), may prevent the glue sphere from initially touching the edges or the surfaces outside of the guide-surface area. Therefore, the curvature of the fillet profile may preferably be arranged as concave-down. Still further, the profile of fillet S may result in a stronger bond than a chamfer, but a chamfer guide-surface area is nonetheless a functional alternative to a fillet 159.

Adhesive on the end of a needle-shaped applicator will naturally form into a small sphere. Use of a mathematical relationship between the glue sphere volume and the total open volume available between the inner housing 150 and the inserted capillary 140 may prevent excessive amounts of glue from being applied. The volume $V_1$ of the glue sphere having diameter d is set equal to the volume $V_2$ of the open space between the inserted capillary 140 and the inner housing 150, the boundaries of the volume $V_2$ being defined by the inner housing 150, the wall of the inserted capillary 140, the end of the converging section of the termination location 153 and the base of the glue guide fillet 159. Volume $V_2$ can be determined analytically or via a volume-determining function from a CAD program, for example. Solving for d then gives an upper bound for the glue sphere size with a functional tolerance due to the presence of the applicator tip within volume $V_1$:

$$V_1 = \left(\frac{1}{6}\right)\pi d^3 = V_2 \Rightarrow d = \left(\frac{6V_2}{\pi}\right)^{1/3} \cong 1.24 V_2^{1/3}$$

The value of d is typically of the same order of magnitude as the diameter of the inserted capillary 140, so that, in practice, the approximate diameter of the glue sphere may be checked immediately before glue application.

The diameter of the outlet 115 at the apex 120 of the nozzle housing 105 and the diameter of the through-hole 155 at the first end 151 of the inner housing 150 may vary depending on the application. For example, the diameter of outlet 115 may range from about 25 microns to about 200 microns, while the diameter for the through-hole 155 in the first cylindrical portion 156 of the inner housing 150 may range from about 5 microns to about 100 microns. Other dimensions, however, are contemplated ranging from near-zero up to about several millimeters, all other features of the nozzle being scaled accordingly. In one embodiment, the tip of the first end 151 of the inner housing 150 may be axially co-extensive with outlet 115. In another embodiment, the first end 151 may extend beyond outlet 115, with applications limited to in-vacuum operation.

It is intended that the foregoing detailed description be regarded as illustrative rather than limiting and that it is understood that the following claims, including all equivalents, are intended to define the scope of the invention. The claims should not be read as limited to the described order or elements unless stated to that effect. Therefore, all embodiments that come within the scope and spirit of the following claims and equivalents thereto are claimed as the invention.

Example 1: Two-Photon Laser Lithography for Fabrication of XFEL Sample Injectors I. Synopsis Following are various embodiments for fabrication of XFEL sample injectors via two-photon laser lithography.

II. Motivation and Background

By virtue of their coherent and intense x-ray pulses of femtosecond duration, X-ray Free Electron Lasers (XFEL) are developing into valuable tools for probing the structure of biological macromolecules. The resulting measurements may be biologically relevant only if the sample species can be maintained in a known conformation as it is introduced into the vacuum environment of the XFEL x-ray beam. With rare exceptions, this requires that the sample remain fully solvated in a specified chemical solution throughout the injection process. This solvation of the sample species must not unduly compromise the vacuum environment or cleanliness of the XFEL scattering chamber. Sample injection via liquid-free streams has proven to be the only realistic means of satisfying both the biological and mechanical constraints. In a preferred embodiment, the liquid free-stream may be no more than a few micrometers in diameter in order to both maintain vacuum compatibility as well as to minimize x-ray scattering background. Gas Dynamic Virtual Nozzles ("GDVN") were developed to meet this need, and now routinely deliver liquid free-streams ranging from about 1 µm to about 5 µm in diameter while largely avoiding the clogging difficulties that may preclude injection with a simple solid-walled convergent nozzle. GDVN sample injectors have been employed in numerous biological structure-determination measurements at the SLAC Linac Coherent Light Source ("LCLS"), dating to the onset of LCLS operations in Fall 2009. Although the family of solvated free-stream injectors has recently been extended to include high-viscosity streams extruded under high pressure, including the Lipidic Cubic Phase ("LCP") injectors, the GDVN injectors remain the general workhorse for low viscosity XFEL sample injection. They show potential for use as injectors in general synchrotron x-ray studies.

Figure 5:
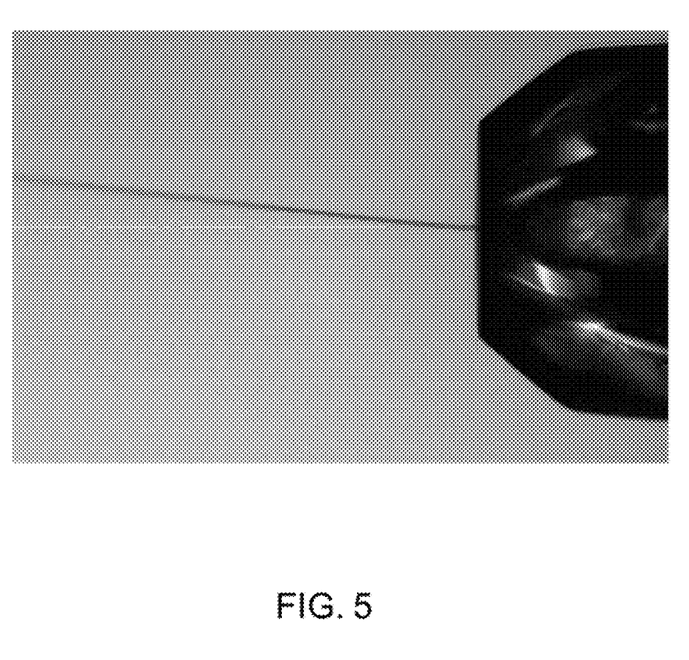
FIG. 5 is an image of a liquid free-stream emerging off-axis due to asymmetry in gas flow resulting from asymmetry in Gas Dynamic Virtual Nozzle ("GDVN") construction.

Typically, GDVN devices are currently assembled entirely by hand and one unit at a time-in what amounts to skilled artisan craftwork. The first step is to form a convergent solid-walled nozzle in the outer sheath of the GDVN assembly. It is the passage of the coaxial GDVN gas flow through this convergent nozzle, and the resulting gas-dynamic forces, that cause the liquid stream to narrow in diameter. This convergent nozzle may be created by flame-burnishing the end of a piece of carefully cleaved borosilicate tubing. The burnishing thickens the tube wall almost to closure and—if done correctly-thereby delivers the desired convergent wall profile. An external cone may then be ground onto the outside of this thickened end section, and finally the front end of the tube may be ground back along the tube axis to form an abrupt truncation of the convergent nozzle at an inner diameter of typically 50 µm. The finished gas aperture may have a cylindrical symmetry and its axis may be concentrically aligned with the axis of the tube. Next an external cone may be ground onto the end of a silica capillary (typically a 360 µm OD by 50 µm ID capillary). This cone may also have a cylindrical symmetry and may also be concentrically aligned with the axis of the capillary. The capillary may be inserted into the outer sheath and the tip of the capillary positioned typically 100 µm back from the front end of the sheath. The bore of the coned capillary may be positioned along the axis of the gas aperture. The diameter and direction of the liquid jet that emerges from the assembled GDVN structure depends on how closely the desired symmetry can be approached for both the individual components and the overall assembly. FIG. 5 illustrates this point; although the nozzle geometry appears reasonably symmetric, the gas flow clearly is not, with the result that the liquid free-stream does not emerge directly along the axis of the nozzle. Since the liquid stream supercools via evaporation in vacuum, an off-axis liquid jet can lead to ice growth moving backwards to the nozzle from the point where the liquid free-stream strikes the wall of the injector shroud. The smaller the diameter of the liquid jet, the more difficult it may be to generate an on-axis free-stream. Tools and techniques have been developed to minimize asymmetries in GDVN fabrication and assembly, but nozzle fabrication remains a demanding handwork. A general method of mass-producing highly symmetric nozzles would therefore be advantageous.

Two-photon laser lithography (also known as "Two-Photon Polymerization" or "2PP") may be a method by which mass-production can be achieved. The technique may employ a tightly focused pulsed laser to "expose" a photoresist, but differs from convention laser lithography by virtue that the laser and photoresist are chosen such that absorption of two photons is necessary to induce polymerization. Consequently a voxel of the photoresist may be polymerized only if the laser energy deposited in the voxel exceeds a certain threshold value. By appropriately tailoring the intensity and duration of the laser pulse, the dimensions of the polymerized volume may be made significantly smaller than the diffraction limit of the laser light. Sub-micron resolution appears to be relatively routine, and feature sizes as small as 50 nm have been reported. Moreover, it is a true 3D fabrication technique, capable of "writing" any desired voxel within a specified 3D volume. Commercial instruments that have the ability to write 3D structures in this fashion are now being sold. Since all critical GDVN dimensions are on the order of 20 μm or greater, this resolution would suffice to produce GDVN of very high symmetry-much higher than heretofore possible. Moreover, the ability to accurately write micron-sized features in 3D with sub-micron resolution raises the possibility of other interesting injector applications, including nozzles that mix two or more fluids on microsecond time scales yet still deliver the mixed fluid as a single, laminar, linear liquid free-stream. Other methods for fabricating microfluidic devices do exist, but none offer the sub-micron capabilities of the two-photon process. The resolution of conventional PDMS microfluidics fabrication may bottom out at one to a few micrometers. The most advanced "additive" 3D printers may be limited to 10 μm resolution (i.e., layer thickness). The garden variety of this genre is generally limited to about 100 μm.

Resolution is not the end of the story. For example, forming the device solely of simply connected geometrical surfaces may permit writing only the bounding surfaces rather than the entire volume, thereby significantly decreasing the write-time. The unexposed photoresist within all open channels may then be flushed out and the remaining photoresist (within the closed structural volumes) exposed by an unfocused, higher frequency, single-photon process.

III. 2PP Fabrication of GDVN Nozzles

Write-speed and write-volume may be considerations in two-photon laser lithography. Write-envelopes of 40×40×60 mm have been reportedly written at 200 nm resolution in both intra-layer and inter-layer planes using a 100 fs, 800 nm Ti:Sapphire laser. However, filling this entire write-volume with features of 200 nm resolution may be prohibitively time consuming (e.g., on the order of days). Reasonably shorter write-times (<1 hr/device) may be provided by apparatus described herein by, for example, restricting a region of the device to be written to high resolution. For example, sub-micron resolution may only be needed at the very front or outlet end of the nozzle geometry, in the last 500 μm or so, and a resolution of about 5 μm may suffice for the remainder of the nozzle structure. In one embodiment, it may be permissible to write only the bounding surfaces of internal structures, rather than the entire volume of the structures. In this case, the geometry of the nozzle structure may be appropriately designed to accommodate this. In addition, the engineering design may accommodate fabrication issues such the removal of unexposed photoresist from internal cavities after the 2PP photoresist has been exposed. The fastest write-speed presently available may be that of the Nanoscribe Photonic Professional GT. The instrument reportedly has a write-envelope of 100×100×1 mm³ and a linear write-speed of 25 mm/sec.

In alternative fabrication techniques, rather than creating the nozzle itself, a separate approach may be to fabricate-using 2PP processing—a mold of high spatial resolution that may then be employed in conventional PDMS microfluidics fabrication to create the actual nozzle. Since the resolution is set by the mold, in this example, high resolution features may be obtained that may otherwise be precluded by conventional microfluidics processing. For example, a possible 2PP mold over which PDMS may be poured to form one-half of a GDVN nozzle having three large cylindrical cavities that are mounting holes for standard 360 μm outer diameter capillaries. Capillaries to supply gas may be glued into the outer two of these, and the liquid sample capillary into the center. The convergent channels in front of the large cylindrical cavities form the GDVN nozzle. Open space between these channels in this "negative" may be solid material after the PDMS is poured, cured, and peeled free. Two PDMS surfaces can be bonded by simply pressing them together after activating them in an oxygen plasma. Accordingly, the two-half nozzles may be easily joined to create a full PDMS nozzle with the only technically demanding aspect of the process being the aligning of the two halves prior to joining. In one embodiment, self-alignment may be possible. Specifically, in one example, a small amount of methanol placed on the activated surfaces may prevent immediate bonding, and the pieces may automatically align by virtue of surface tension. The aligned piece may then be placed on a hot plate to evaporate the methanol layer and fully bond the mating surfaces.

IV. Mixing Nozzles

For time-resolved study of chemical processes, two or more chemical solutions may be mixed on time scales relevant to the process under study. All mixing may be by diffusion, and the time scale may be determined solely by the diffusion coefficients of the diffusants and by the distance across which they diffuse. Turbulent flow, that may facilitate the mixing simply by creating fluid eddies of small size, may require Reynolds numbers R=ρu d/μ of 50 or greater, usually much greater. (Here ρ is the fluid density, u the fluid speed, d the nozzle diameter, and μ the fluid viscosity). Given the small dimensions and relatively low flow speeds of a GDVN nozzle, its Reynolds number R is typically under 0.05 even in the outgoing GDVN liquid free-stream and may be a factor of ten lower within the nozzle channel where the mixing may actually take place. This is typically too low for turbulent flow and accordingly liquid streams of this sort may mix by diffusion across the boundary between laminar streams. The Stokes-Einstein relation gives the translation diffusion coefficient D of a sphere of radius r and the temperature T and the fluid viscosity, $$D = \frac{k_B T}{6\pi\mu r}.$$

The larger a particle is therefore, the slower its diffusion. Mixing times even of small molecules across typically-sized laminar jets tend to be in the millisecond range. Faster mixing requires the fluids to be intermingled in extremely thin threads or streamers. However, asperity-guided GDVN nozzles may intermingle two extremely thin threads of fluid at the tip of a GDVN nozzle, thereby delivering short mixing times. In a similar manner, two flows may be intermingled in thin sheets using hydrodynamic flow focusing, possibly even incorporating sheath flows to avoid "pre-mixing" of the two interacting fluids. With such devices, it may be possible to diffuse small molecules from one fluid stream into an adjacent one on time scales of several tens of microseconds. (Large biomolecules typically diffuse more slowly, given their lower diffusion coefficients.) Mixing times down to 10 μs have been reported by inducing turbulent eddies on the downstream side of a spherical obstacle in a 100 μm diameter nozzle. However turbulent flow may be largely incompatible with formation of a microscopic liquid free-stream and also may require the highest possible flow speeds (giving increased sample consumption) and passage through the smallest possible orifices (giving increased clogging). Hence there may be many trade-offs, but in order to achieve the fastest laminar mixing two fluids may intermingle in the smallest possible streams within the smallest possible overall volume.

Example 2: 3D-Printed Gas Dynamic Virtual Nozzles for X-Ray Free Electron Laser Studies

BACKGROUND

X-ray Free Electron Lasers

With peak intensities that may be $10^8$-$10^{10}$ times greater than those of synchrotron sources, the X-ray free electron laser ("XFEL") has enabled novel methodological advances in biological imaging via serial femtosecond crystallography ("SFX"). In contrast to conventional X-ray protein crystallography where samples are cryogenically prepared to mitigate radiation damage, SFX probes protein crystals that are suspended in their mother liquor. They may be continuously injected across a pulsed X-ray beam. X-ray pulses are so brief that radiation damage may be outrun. Information about the unperturbed structure in its native environment is captured before X-ray damage has any effect on the sample, such that acquired structure data more reliably reflects the biologically active state of the protein sample. Furthermore, protein crystals that are too small and/or sensitive to radiate, including delicate human membrane proteins, may be imaged using SFX.

Gas Dynamic Virtual Nozzles

Continuously transporting millions of environmentally sensitive protein crystals through high vacuum and into the pathway of the X-ray beam may be accomplished with the Gas Dynamic Virtual Nozzle ("GDVN"), which may be capable of delivering a continuous, steady supply of hydrated sample in UHV for several hours without clogging.

For example, if the tapered end of a straight-bore capillary is placed in a focused gas sheath the emerging liquid forms may form a jet that subsequently breaks up into droplets due to Rayleigh-Plateau instability. Unlike conventional solid-walled nozzles, the walls of this "virtual" nozzle are made of gas, thereby reducing clogging.

GDVN Fabrication

Figure 6A:
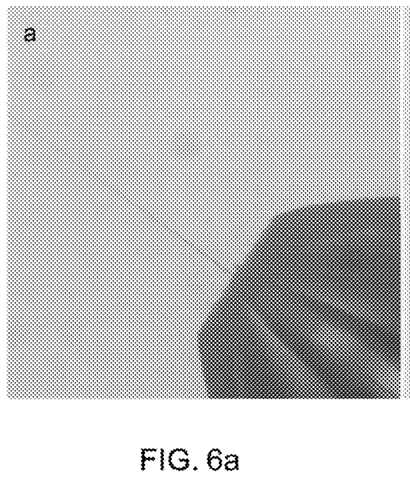
FIG. 6a is an image of a traditional GDVN producing a liquid jet.
Figure 6B:
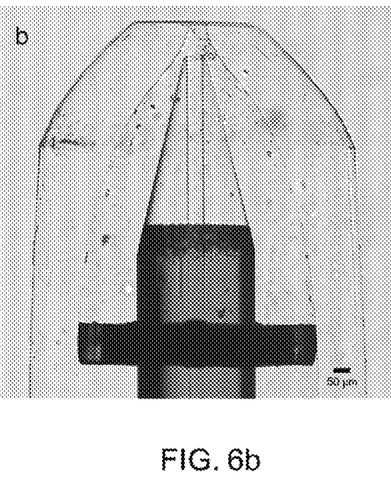
FIG. 6b is an image of the internal structure of a traditional GDVN.

To fabricate such an injector, the end of a small length of glass capillary may be flame polished and grounded to create a converging inner profile and beveled exterior. The opposite end of this capillary may be inserted and glued into a section of stainless steel tubing, so that the modified end of the glass capillary protrudes several millimeters. A smaller, polyimide-coated, glass capillary 140ith its end grounded into a truncated cone may be inserted into this apparatus and brought into close proximity with the converging section at the modified end of the outer glass capillary. Axial centering of the capillary may be accomplished with a spacer as shown in FIG. 6b or by using an outer capillary 140ith square cross section.

GDVN's typically operate with pressurized gas, where one gas source drives the sample of interest down the inner capillary and the other gas source flows coaxially through the outer glass capillary and may be geometrically focused near the tip. The sample emerges from the conical tip of inner capillary directly into this gas-focusing region and may thereby be reduced in size by a factor of 10 or more; typically a 50 micron emergent stream is reduced gas-dynamically to a jet of about 1 micron to about 5 microns. This jet may leave the gas aperture as a freely suspended stream, remaining liquefied even in a high vacuum environment (FIG. 6a).

Submicron sized jets, which are of importance to the development of single particle imaging methods, have been realized by adjusting the capillary position and gas aperture geometry so that the cone of the inner capillary tip is flush with or protrudes slightly outside of the gas aperture, placing the emerging stream directly into the supersonic flow of the free-jet expansion produced while exhausting into vacuum.

Despite having been used effectively to date in a number of protein imaging experiments, improvements to the fabrication process may be desired. The artisan-like fabrication method described above typically results in irreproducible nozzles. Each nozzle is unique in its reliability, capability, and operating parameters. And not every nozzle therefore may perform as desired.

GDVN jetting may be sensitive to slight asymmetry in the modified end of the outer capillary and/or misalignment of the central capillary line thereto, leading to undesirable behavior such as off-axis jetting and instability. This may be problematic during SFX experiments. Unstable jets may be difficult to hit or target with the X-ray, reducing data collection rates. Off-axis jetting in vacuum environments typically leads to ice formation as the jet hitting a nearby wall may freeze and grow back along the stream until the nozzle is rendered inoperable. Furthermore, ice formation near the nozzle tip may present a problem for sensitive detection equipment. For example, if the intensity of the X-ray beam is maximized for a weakly diffracting sample, the sudden introduction of strongly diffracting ice can cause damage to the detector. Consequently, nozzle fabrication typically requires great skill and time to produce reliable jets for an increasingly large and complex experimental demand.

Microfabrication Techniques

Improved fabrication may be needed to achieve reliable jets consistently. Many microfabrication techniques exist that offer greater resolution, repeatability, and yield. Soft photolithography has recently been used to fabricate functional polydimethylsiloxane (PDMS) GDVN devices. Injection molding has been used to replace the modified end of the outer glass capillary 140ith a strong, high-resolution ceramic material. However, PDMS GDVN devices, while simple and functional, may not be sufficiently durable under extreme pressure conditions, and injection-molded gas apertures may still require manual positioning of the inner glass capillary. A technique is desired to build all GDVN components in robust material using a single process. Direct laser writing may offer the ability to write both the internal and external GDVN structures at high resolution in robust materials with write times on the order of hours.

3D Printing Gas Dynamic Virtual Nozzles

2-Photon Polymerization (2PP) is a direct-write non-linear absorption process that may be capable of patterning structures with resolution well beyond the diffraction limit. By tightly focusing a laser in a medium that is sensitive to only higher order effects, just a small region near the beam focus may be polymerized. Features as small as 100 nm to 150 nm may be made reproducibly. By moving the absorbing medium relative to the laser in a controlled manner, as in with a computer generated design, complex high resolution structures may be realized. In principle this allows all GDVN components to be formed using a single process at high resolution.

However, challenges in making 2PP a viable printing technology for the GDVN may arise due to the extreme differences in scale. For example, the relatively large size of a traditional GDVN may make submicron resolution scanning a prohibitively long process in the absence of specialty fast-writing stages. The Photonic Professional GT from Nanoscribe GmbH may be used to meet these device-specific challenges. It utilizes a 3-dimensional piezoelectric stage and galvo mirror system to achieve fast write times (e.g., 10 mm/s and 100 µm/s respectively) over a volume of approximately 300×300×300 cubic microns. These fast-write volumetric units may be stitched together with standard motorized stages. Working in concert for the particular application, these systems may allow writing times that are much faster than the norm.

Fabrication

Nozzle Design

The nozzle may be designed using standard CAD software. In order to minimize the write time the 3D printed GDVN may be designed to be as small as possible, taking into consideration the need for the device to withstand both high and low pressure extremes as well as the need for feasibility in the manner of coupling the device to supply lines. Furthermore, the various 3D printed channels may be made to be as open as possible while maintaining structural integrity. This may be desirable to aid in the successful removal of uncured photoresist from very small closed channels.

3D Printing

The printing system was successfully adapted to use a larger objective focusing lens and a corresponding resist formula. This resulted in lower resolution (500 nm) but faster writing, since a larger volume was traced out in the same amount of time. The system produced 400×400×400 cubic micron fast-write units. This allowed the nozzles described herein to be written in under 4 hours. As a comparison, an earlier iteration of similar size took 24 hours to write using the higher resolution objective lens.

Figure 7A:
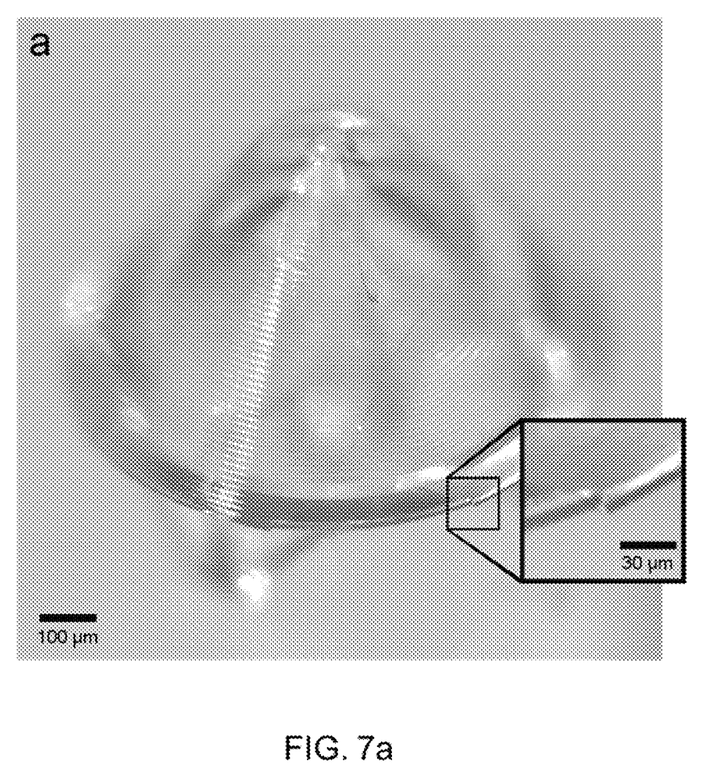
FIG. 7a is an image of a 3D printed GDVN attached to a glass substrate manufactured with 3D-printing stitching between 400×400×400 µm3 fast-written units is shown as vertical parabolic cross-sections.
Figure 7B:
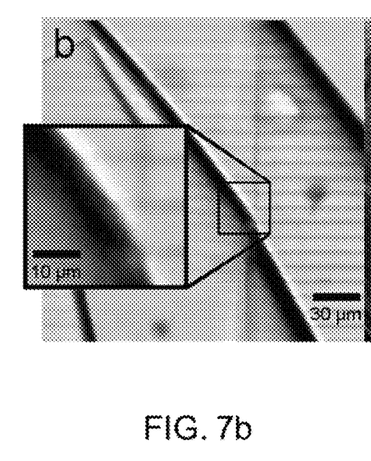
FIG. 7b is an index-matched image of the GDVN of FIG. 7(a) immersed in glycerol showing projection of both vertical and horizontal stitching; the horizontal stitching showing minimized disruption to continuity of features, while vertical stitching shows separation between the horizontal stitching.
Figure 7C:
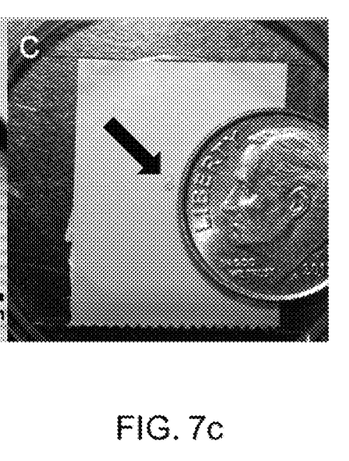
FIG. 7c is an image of the GDVN of FIG. 7(a) next to a U.S. dime.

The stitched interfaces between the 400×400×400 µm³ fast-written units were visible with optical microscopy as vertical parabolic cross-sections through the cone of the nozzle. Additional stitching interfaces, presumably between vertical motor advancements, were seen as thin horizontal slices spaced about 10 µm apart (FIG. 7a). Optical microscopy of nozzles immersed in a nearly index-matched medium (Glycerol) gave an undistorted view of both types of stitching as projected through the nozzle (FIG. 7b). The absolute positioning error for the horizontal slices was almost undetectable with optical microscopy, suggesting submicron error. However, disruptions in the continuity of sidewall profiles were visible as 1 to 2 micron-sized dips at the edge of each horizontal stitched region (FIG. 7b inset). Positioning errors between 400×400×400 µm³ fast-written units were more apparent, ranging from 1 to 5 µm (FIG. 7a, 7b inset).

Connecting Sample Lines

Figure 8A:
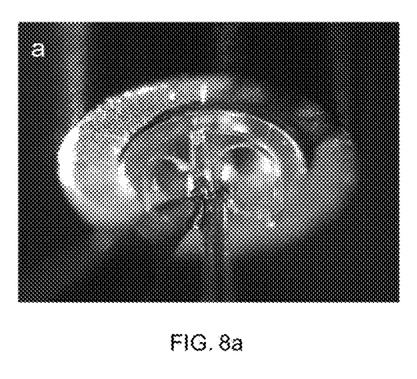
FIG. 8a is an image of one example embodiment of the claimed apparatus showing the placement of an inner capillary supply line in the nozzle apparatus via a micromanipulator and held in place by glue.
Figure 8B:
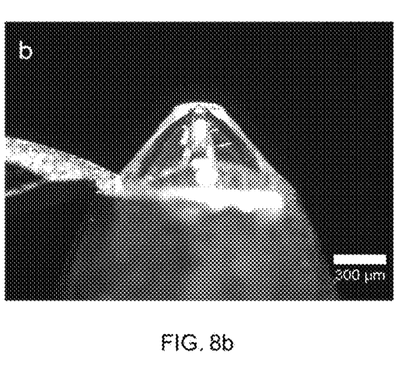
FIG. 8b is an image of one example embodiment of the claimed apparatus showing the placement of the nozzle apparatus of FIG. 8a into a gas transport tube and held in place by glue.

The sample lines were glued into place using a custom mounting stage with a commercial micromanipulator. Gluing of the inner capillary 140 as achieved by first inserting the capillary into the receiving port of the printed nozzle. A small drop of fast-curing epoxy was placed on the end of a hypodermic needle that was attached to the micromanipulator. The tip of the needle was brought near to the gluing target with preprogrammed coordinates and then controlled manually for the gluing process. The "glue guide" functioned according to its design to draw a single drop of applied epoxy completely around the inserted capillary using capillary forces (FIG. 8a). The epoxy bond between the inner capillary and the printed nozzle was allowed to fully cure overnight before adhering it to the outer gas transport tube. The end of the gas transport tube was grinded to match the angular relief of the printed nozzle. Careful design of the nozzle dimensions allowed the nozzle to be inserted into the gas transport tube and held in place by friction. Epoxy was then applied to the interface using the micromanipulator, and distributed by rotating the gas transport tube relative to the fixed micromanipulator applicator position (FIG. 8b). For testing purposes a thin-walled glass capillary 140 as placed between the nozzle and a different stainless steel gas transport tube of slightly larger inner diameter, similar to what is done with conventional GDVN fabrication. However, in practice, a direct connection from the printed nozzle to the stainless steel gas transport tube is preferred for rigidity. Helium gas was supplied to the gas transport tube through a second glass capillary that was inserted into the gas transport tube. Epoxy was applied by hand to the rear end of the tube in order to provide a gastight seal and to fix all capillaries in place with respect to each other. After the epoxy was fully cured the stainless steel tube was attached to the standard GDVN holder apparatus, which in turn has connections to the nozzle rods used for in-vacuum sample injection.

Results

In-Lab Testing

Figure 9:
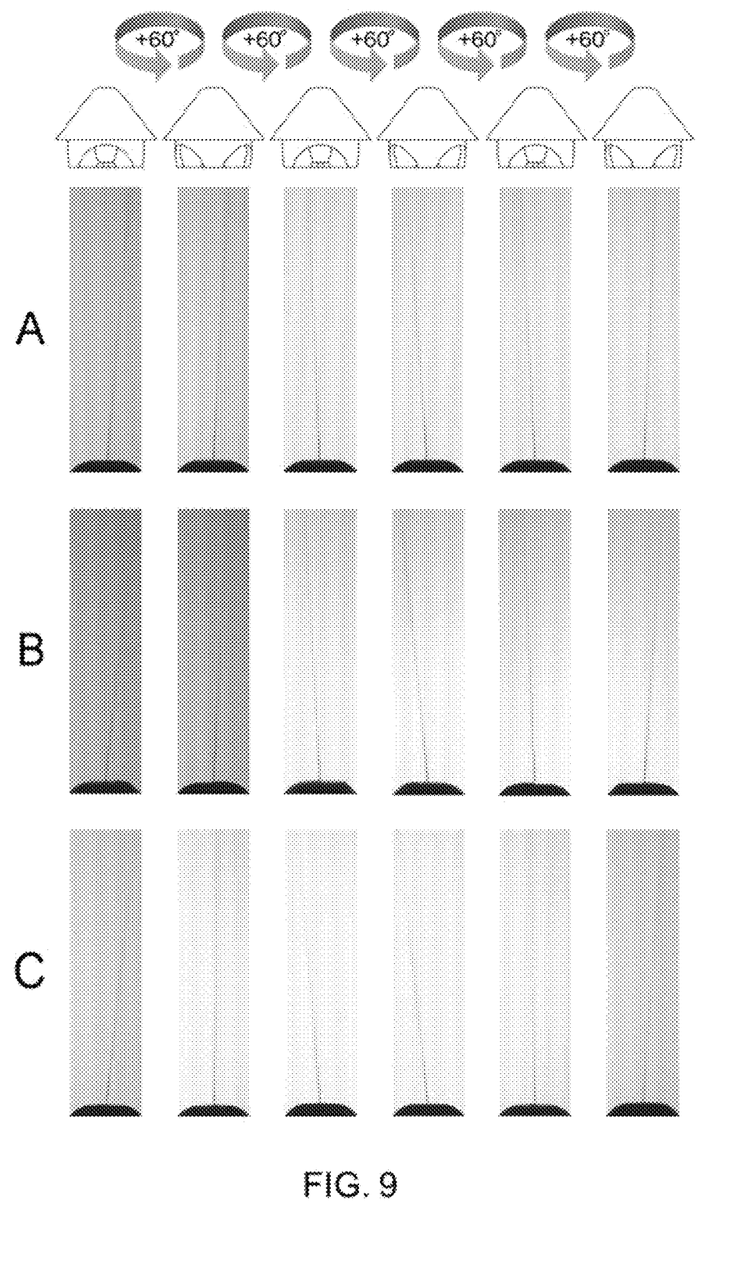
FIG. 9 shows images of three nozzle apparatus labeled A, B and C producing liquid jets in accordance with one embodiment of the invention. The images taken left to right are images captured between 60-degree rotations of each nozzle apparatus A, B and C about their axis.

Three nozzles were tested with pure water and helium gas to determine whether the printing resolution and symmetry were sufficient to produce a straight jet and to test whether the nozzles performed in a reproducible manner without fracturing. Initial observations revealed that the nozzles did not jet straight in either vacuum or atmosphere, that the nozzles required very little helium gas pressure to operate compared to the traditional GDVN with a 2 meter long, 100 µm ID gas supply capillary at a flow rate of 5 µl/min (<50 psi compared to about 300 psi as measured upstream of the supply capillary), and that the angular deviation of the jet trajectory from the nozzle axis was highly dependent on helium gas pressure. Comparative tests of the three nozzles were performed by taking videos of each nozzle jetting while being rotated slowly about the nozzle axis. For these tests helium gas pressure, water flow rate, and supply capillary length were made identical for the testing of each nozzle by never adjusting the gas regulator position between nozzle changes, using an in-line digital liquid flow meter, and cutting the capillaries to equal lengths within 1 cm. Imaging points during rotation were chosen at 60-degree intervals based on the centering of the cylindrical outer sidewall of the nozzle as shown in FIG. 9. Collections of these images in sequence were compared side by side and matched according to the angular deviation of the jet from the nozzle axis (FIG. 9). The result was that the nozzles did jet reproducibly, as shown in FIG. 9.

Serial Crystallography

Figure 10:
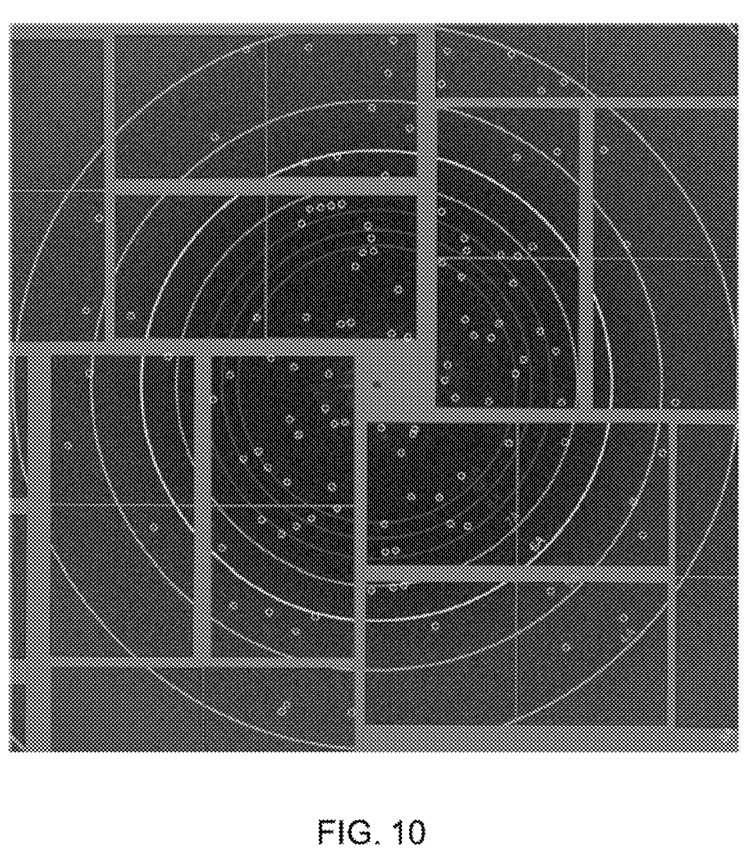
FIG. 10 shows an image of membrane protein diffraction obtained using a nozzle apparatus according one embodiment of the invention, with sharp spots extending to 4 Å.

Two nozzles were used in actual serial crystallography experiments (SFX) at the CXI station at the Linac Coherent Light Source (LCLS, a free-electron X-ray laser) to test whether or not the resist material showed any adverse effects. Background produced by the nozzles when in close proximity with the x-ray beam was measured at 10% and 100% transmission. Crystal screening was performed using the nozzles for two membrane proteins. A snapshot diffraction pattern obtained with a printed nozzle at CXI is shown in FIG. 10, with sharp Bragg spots extending to 4 Å resolution. This pattern was collected with 8.7 keV, using 40 fs XFEL pulses, with a distance of 138 mm between sample and detector. No evidence was observed that the printed nozzles affected diffraction quality compared to patterns obtained from the same samples using standard GDVN nozzles. Overall, the jets appeared to perform very similarly in comparison with the standard glass capillary-tube GDVN.

Discussion and Conclusion

The images collected in FIG. 9 suggest that the nozzles are reproducible to a very reasonable approximation. It is important to consider that small variations in this reproducibility may be attributable to factors other than the quality of the printed nozzles themselves. These factors include reproducibility of the gluing process, the apparatus upstream of the nozzle, and the operating parameters for each nozzle. Experimental errors also play a role, such as the perpendicularity of the microscope camera to the nozzle, which tends to vary as the nozzle is rotated. Another consideration is that the sequence of six images for each nozzle taken during rotation was performed without a universal starting point since the appearances of the nozzle at 120-degree rotations are essentially indistinguishable. Although comparing the sequences side by side quickly lead to the matching of the sequences, printing distinctive markers at 60-degree intervals on the nozzles themselves would have more conclusively showed reproducibility.

The fact that the nozzles jet off-axis in a reproducible way suggests that there is a systematic flaw in the printing process, such as a slight skew along the nozzle's nominal symmetry axis. In this case the nozzles themselves could in principle be used to calibrate the printing machine, or the computer-generated design itself could be modified to correct for the error in the printing process. Another possible reason for off-axis jetting is that the nozzle design itself is not optimized for stable jetting, a condition that would need to be verified with additional studies. The potentially gas permeable stitching interfaces may also play a role in redirecting the jet. Another possibility is the hardening of residual photoresist left behind due to incomplete chemical development, which was observed just upstream of the tip of the inner nozzle structure in the complete version of the image shown in FIG. 7b (essentially not pictured in FIG. 7b). However, if these depositions cause off-axis jetting, we would expect that the essentially random deposits of extra material would lead to irreproducible jets.

In actual experimentation the off-axis jetting did not appear to impair data collection. It was confirmed that the photoresist material itself does not appear to adversely affect the protein crystals. In most respects, the printed nozzle performance was no different than the performance of standard GDVN's, apart from the noticeable improvement in reproducibility when compared to hand-crafted nozzles.

This successful acquisition of diffraction data in serial crystallography experiments indicates that 2PP 3D printed nozzles can be used in place of glass capillary GDVN systems with the immediate advantage of reproducible nozzle fabrication for rapid prototyping and development of new types of jets. Further work is expected to provide optimized dimensions for best performance, and a range of other jets for other purposes, such as solution scattering and possibly single-particle imaging.

The invention claimed is:

1. A nozzle apparatus, comprising:
   an outer nozzle housing defining a cavity and having an outlet defined at an apex of the cavity;
   a cylindrical sidewall coupled to a base of the nozzle housing, wherein the cylindrical sidewall defines a plurality of arch-shaped voids;
   an inner housing coupled to the outer nozzle housing, wherein the inner housing has a first end and a second end, wherein at least the first end of the inner housing is arranged within the cavity of the outer nozzle housing, wherein the inner housing defines a through-hole that is arranged concentric with the outlet of the outer nozzle housing;
   a first plurality of ribs coupled to the first end of the inner housing and the outer nozzle housing; and
   a second plurality of ribs coupled to the second end of the inner housing and the cylindrical sidewall,
   wherein the plurality of arch-shaped voids comprises three arch-shaped voids, wherein the second plurality of ribs comprises three ribs spaced 120 degrees apart and each coupled to a portion of the cylindrical wall extending between the arch-shaped voids.

2. The nozzle apparatus of claim 1, wherein the cavity of the outer nozzle housing is conical-shaped.

3. The nozzle apparatus of claim 1, wherein the second plurality of ribs is further coupled to the outer nozzle housing.

4. The nozzle apparatus of claim 1, wherein the first plurality of ribs comprises three ribs spaced 120 degrees apart and each of the first plurality of ribs is offset 60 degrees from each of the second plurality of ribs.

5. The nozzle apparatus of claim 1, wherein the through-hole of the inner housing has a first cylindrical portion at the first end, a second cylindrical portion at the second end and a midsection therebetween that tapers outward from the first cylindrical portion to the second cylindrical portion.

6. The nozzle apparatus of claim 5, wherein the second end of the inner housing defines a fillet or a chamfer around an edge of the second cylindrical portion of the through-hole.

7. The nozzle apparatus of claim 6, further comprising: a capillary coupled to the second end of the inner housing.

8. A nozzle apparatus, comprising:
   an outer nozzle housing defining a cavity and having an outlet defined at an apex of the cavity;
   a cylindrical sidewall coupled to a base of the nozzle housing, wherein the cylindrical sidewall defines a plurality of arch-shaped voids;
   an inner housing coupled to the outer nozzle housing, wherein the inner housing has a first end and a second end, wherein at least the first end of the inner housing is arranged within the cavity of the outer nozzle housing, wherein the inner housing defines a through-hole that is arranged concentric with the outlet of the outer nozzle housing;
   a plurality of ribs coupled to the second end of the inner housing and the cylindrical sidewall,
   wherein the plurality of arch-shaped voids comprises three arch-shaped voids, wherein the plurality of ribs comprises three ribs spaced 120 degrees apart and each coupled to a portion of the cylindrical wall extending between the arch-shaped voids.

9. The nozzle apparatus of claim 8, wherein the cavity of the outer nozzle housing is conical-shaped.

10. The nozzle apparatus of claim 8, wherein the plurality of ribs is further coupled to the outer nozzle housing.

11. The nozzle apparatus of claim 8, wherein the through-hole of the inner housing has a first cylindrical portion at the first end, a second cylindrical portion at the second end and a midsection therebetween that tapers outward from the first cylindrical portion to the second cylindrical portion.

12. The nozzle apparatus of claim 11, wherein the second end of the inner housing defines a fillet or a chamfer around an edge of the second cylindrical portion of the through-hole.

13. The nozzle apparatus of claim 12, further comprising: a capillary coupled to the second end of the inner housing.

14. The nozzle apparatus of claim 13, wherein a tip of the capillary is disposed in the second cylindrical portion of the inner housing, wherein the tip of the capillary is flat.

15. The nozzle apparatus of claim 14, wherein a tip of the capillary is disposed in the tapered midsection of the inner housing, wherein the tip of the capillary is angled.

16. The nozzle apparatus of claim 13, wherein a tip of the capillary is located 400 μm or less from the outlet of the outer nozzle housing.

17. The nozzle apparatus of claim 8, wherein an external wall of the first end of the inner housing is tapered.

18. The nozzle apparatus of claim 8, wherein an external wall of the second end of the inner housing curves outward.

19. The nozzle apparatus of claim 8, wherein an exterior surface of the outer nozzle housing is beveled or conically-shaped.

20. The nozzle apparatus of claim 8, wherein a beveled-surface is defined between each of the plurality of arch-shaped voids and an interior surface of the cylindrical sidewall.

\* \* \* \* \*